US006871174B1

(12) United States Patent
Dolan et al.

(10) Patent No.: US 6,871,174 B1
(45) Date of Patent: Mar. 22, 2005

(54) SYSTEM AND METHOD FOR MATCHING A TEXTUAL INPUT TO A LEXICAL KNOWLEDGE BASE AND FOR UTILIZING RESULTS OF THAT MATCH

(75) Inventors: William B. Dolan, Redmond, WA (US); Michael Barnett, Seattle, WA (US); Stephen D. Richardson, Redmond, WA (US); Arul A. Menezes, Bellevue, WA (US); Lucretia H. Vanderwende, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/572,765

(22) Filed: May 17, 2000

Related U.S. Application Data

(63) Continuation-in-part of application No. 08/886,814, filed on Mar. 7, 1997, now Pat. No. 6,076,051.

(51) Int. Cl.[7] .............................................. G06F 15/62
(52) U.S. Cl. ........................................................... 704/9
(58) Field of Search ........................ 704/9–10; 707/100

(56) References Cited

U.S. PATENT DOCUMENTS

| | | | | |
|---|---|---|---|---|
| 4,839,853 | A | | 6/1989 | Deerwester et al. ............ 707/5 |
| 5,278,980 | A | | 1/1994 | Pedersen et al. ................ 707/4 |
| 5,325,298 | A | | 6/1994 | Gallant ............................ 704/9 |
| 5,377,103 | A | | 12/1994 | Lamberti et al. ....... 364/419.08 |
| 5,424,947 | A | | 6/1995 | Nagao et al. .................... 704/9 |
| 5,488,719 | A | * | 1/1996 | Kaplan et al. ............... 707/100 |
| 5,592,661 | A | | 1/1997 | Eisenberg et al. ........... 707/104 |
| 5,617,578 | A | * | 4/1997 | Kroll et al. ...................... 704/9 |
| 5,619,709 | A | | 4/1997 | Caid et al. ................... 707/532 |
| 5,675,745 | A | | 10/1997 | Oku et al. ........................ 705/7 |
| 5,675,819 | A | | 10/1997 | Schuetze ......................... 704/9 |
| 5,724,594 | A | | 3/1998 | Pentheroudakis ............... 704/9 |
| 5,794,050 | A | | 8/1998 | Dahlgren et al. ............ 395/708 |
| 5,794,178 | A | | 8/1998 | Caid et al. ....................... 704/9 |
| 5,799,308 | A | | 8/1998 | Dixon ......................... 707/100 |
| 5,873,056 | A | | 2/1999 | Liddy et al. ..................... 704/9 |
| 6,006,221 | A | | 12/1999 | Liddy et al. ..................... 707/5 |

FOREIGN PATENT DOCUMENTS

| | | |
|---|---|---|
| EP | 0 304 191 A2 | 2/1989 |
| EP | 0 304 191 A3 | 2/1989 |
| EP | 0 386 825 A1 | 9/1990 |
| EP | 0 687 987 A1 | 12/1995 |
| EP | 0 805 404 A1 | 4/1997 |

OTHER PUBLICATIONS

Dagan et al., "Similarity–Based Estimation of Word Coocurrence Probabilities," in Proceedings of the 32nd Annual Meeting of the ACL, 1994, pp. 272–278.

Dagan et al., "Contextual Word Similarity and Estimation From Sparse Data," in Proceedings of the 31st Annual Meeting of the Assoc. for Computational Linguistics, Columbus, OH, Jun. 2–26, 1993, pp. 164–171.

Resnik, Philip, "Disambiguating Noun Groups With Respect to WordNet Senses," in Proceedings of the Third Workshop on Very Large Corpora, MA, Jun. 31, 1995, pp. 1–16.

(List continued on next page.)

*Primary Examiner*—David D. Knepper
(74) *Attorney, Agent, or Firm*—Joseph R. Kelly; Westman, Champlin & Kelly, P.A.

(57) ABSTRACT

The present invention can be used in a natural language processing system to determine a relationship (such as similarity in meaning) between two textual segments. The relationship can be identified or determined based on logical graphs generated from the textual segments. A relationship between first and second logical graphs is determined. This is accomplished regardless of whether there is an exact match between the first and second logical graphs. In one embodiment, the first graph represents an input textual discourse unit. The second graph, in one embodiment, represents information in a lexical knowledge base (LKB). The input graph can be matched against the second graph, if they have similar meaning, even if the two differ lexically or structurally.

98 Claims, 9 Drawing Sheets

OTHER PUBLICATIONS

Salton, Gerard, and Michael J. McGill, Introduction to Modern Information Retrieval, McGraw–Hill Publishing Co., New York, NY 1983, pp. 1–448.

Wilks et al., "Providing Machine Tractable Dictonary Tools," Machine Translations 5:99–154, 1990.

Hindle, Donald, "Noun Classification From Predicate–Argument Structures," in Proceedings of the 28th Annual Meeting of the ACL, Pittsburgh, PA. Jun. 6–9, 1990, pp. 268–275.

Sato, Satoshi, "Example–Based Machine Translation," in Proceedings of the International Workshop on Fundamental Research for the Future Generation of Natural Language Processing, Kyoto, Japan, Sep. 1991, pp. 1–16.

Hearst, Marti A., and Gregory Grefenstette, Refining Automatically–Discovered Lexical Relations: Combining Weak Techniques for Stronger Results,: in Papers From the 1992 AAAI Workshop, Menlo Park, CA 1992, pp. 64–72.

Furuse, Osamu, and Hitoshi Iida, "An Example–Based Method for Transfer–Driven Machine Translation," in Proc. Of the 4th International Conference on Theoretical and Methodological Issues in Machine Translation, Montreal, Quebec, Canada, 1992, pp. 139–150.

Yarowsky, David, "Word–Sense Disambiguation Using Statistical Models of Roget's Categories Trained on Large Corpora," in Proceedings in the 15th Int'l. Conference on Computational Linguistics, Nantes, France, Aug. 23–28, 1992, pp. 454–460.

Brown et al., "Class–Based n–gram Models of Natural Language," Computational Linguistics 18(4):467–479, Dec. 1992.

Tsutsumi, Taijiro, Natural Language Processing: The PLNLP Approach, Kluwer Academic Publishers, Boston, MA, 1993, Chap. 20, "Word–Sense Disambiguation by Examples," pp. 263–272.

Pereira et al., "Distributional Clustering of English Words," in Proceedings of the 31st Annual Meeting of Assoc. for Computational Linguistics, Columbus, OH, Jun. 22–26, 1993, pp. 183–190.

Kozima, Hideki, and Teiji Furugori, "Similarity Between Words Computed by Spreading Activation on an English Dictionary," in Proceedings of the 6th Conference of the European Chapter of the ACL, Utrecht, Germany, 1993, pp. 232–240.

Braden–Harder, Lisa, Natural Language Processing: The PLNLP Approach, Kluwer Academic Publishers, Boston, MA, 1993, Chap. 19, "Sense Disambiguation Using Online Dictionaries," pp. 247–261.

Utsuro et al., "Thesaurus–Based Efficient Example Retrieval by Generating Retrieval Queries From Similarities," in Proceedings of the 15th International Conference on Computational Linguistics, Kyoto, Japan, Aug. 509, 1994, pp. 1044–1048.

Grishman, Ralph, and John Sterling, "Generalizing Automatically Generated Selectional patterns," in Proceedings of the 15th International Conference on Computational Linguistics, Kyoto, Japan, Aug. 5–9, 1994, pp. 742–747.

Uramoto, Naohiko, "A Best–Match Algorithm for Broad–Coverage Example–Based Disambiguation," in Proceedings of the 15th International Conference on Computational Linguistics, Kyoto, Japan, Aug. 5–9, 1994, pp. 717–721.

Agirre, Eneko, and German Rigau, "Word Sense Disambiguation Using Conceptual Density," in Proceedings of COLING 96, 1996, pp. 16–23.

Van Zuijlen, Job M., Probabilistic Methods in Dependency Grammar Parsing,: International Parsing Workshop, 10375–142–141, 1989.

Gerard Salton, "Automatic Information Organization and Retrieval," McGraw Hill Book Company, pp. 168–178 (1968).

Fagan, Joel, L., Ph.D., Experiments in automatic phrase indexing for document retrieval: A comparison of syntatic and non–syntatic methods,: Cornell University, UMI Dissertation Information Service, pp. 1–261 (1987).

James Allen, "Natural Language Understanding," The Benjamin/Cummings Publishing Company, Inc. Chapter 8, pp. 227–238, 1995.

Resnik, Philip, "Disambiguating Noun Groupings With Respect to WordNet Sense," in Proceedings of the 3rd Workshop on Very Large Corpora, Boston, MA., Jun. 30, 1995, pp. 1–16.

* cited by examiner pen <------ Means ------ draw ------ Means ------> pencil pen <------ Means ------ write ------ Means ------>pencil pen ------ Hyp ------> instrument <------ Hyp ------ pencil pen ------ Hyp ------> write ------- Means ------> pencil pen <------ Means ------ write <------- Hyp ------ pencil

FIG. 4B

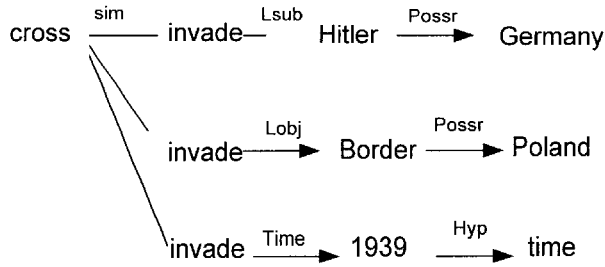
FIG. 4C
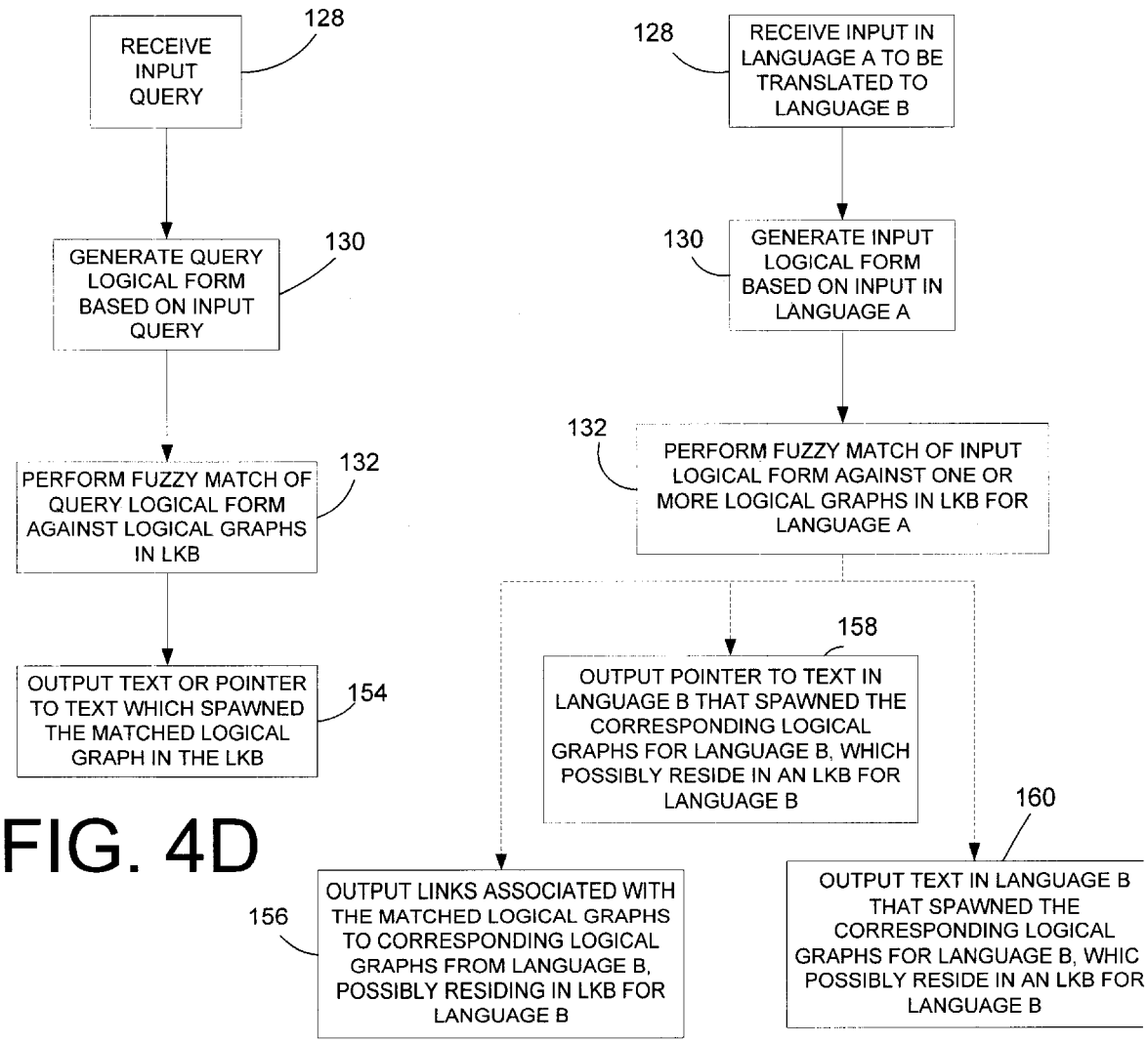
FIG. 4D
FIG. 4E

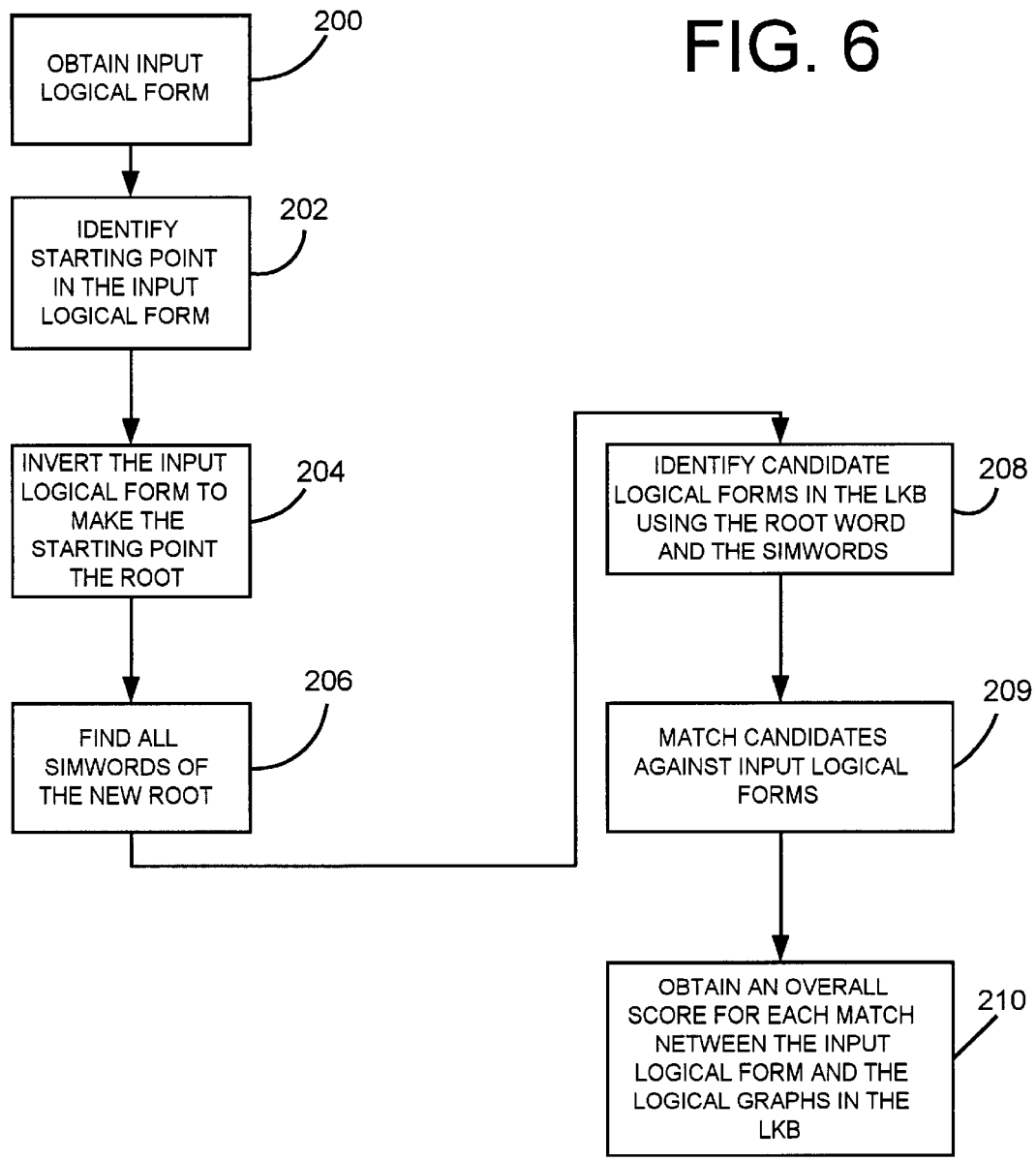

SYSTEM AND METHOD FOR MATCHING A TEXTUAL INPUT TO A LEXICAL KNOWLEDGE BASE AND FOR UTILIZING RESULTS OF THAT MATCH

The following publication is hereby fully incorporated by reference: Richardson, S. 1997, "Determining Similarity and Inferring Relations in a Lexical Knowledge Base", Ph.D. Dissertation, City University of New York.

The present application is a continuation-in-part of, and claims priority from, co-pending U.S. patent application Ser. No. 08/886,814, filed Mar. 7, 1997, and entitled Information Retrieval Utilizing Semantic Representation of Text, which is also hereby fully incorporated by reference.

The following U.S. Patent Applications are hereby fully incorporated by reference: DETERMINING SIMILARITY BETWEEN WORDS, Ser. No. 08/904,223 filed Jul. 31, 1997;

Identifying Salient Semantic Relation Paths Between Two Words, Ser. No. 09/904,418, filed Jul. 31, 1997; and Method and System for Compiling a Lexical Knowledge Base, Ser. No. 08/227,247. Reference is also made to the following related applications: Ser. No. 09/368,071, filed on Aug. 3, 1999, entitled INFORMATION RETRIEVAL UTILIZING SEMANTIC REPRESENTATION; and Ser. No. 09/366,499, filed on Aug. 3, 1999, entitled INFORMATION RETRIEVAL UTILIZING SEMANTIC REPRESENTATION;

BACKGROUND OF THE INVENTION

The present invention is directed to a system and method for determining a relationship (e.g., similarity in meaning) between two portions of text. More specifically, the present invention is related to matching a textual input to a portion of a lexical knowledge base and exploiting the results of that match.

A number of application areas currently being developed attempt to "understand" the meaning of a textual input. Examples of such areas include information retrieval, machine translation, conversational and user interfaces, and natural language processing. For instance, when a user of an information retrieval system enters a query, it is helpful for the information retrieval system to not only exactly match words in a query against words in the database being searched, but also understand the meaning of the query so that it could identify documents related to that meaning, but possibly not using the exact same words.

Similarly, in machine translation systems, some words or phrases do not translate exactly from one language to another. In those instances, it would be helpful for the translation system to understand the meaning of the text to be translated such that the translation can be accomplished more accurately.

In conversational or user interfaces, some computers attempt to receive a natural language input (either spoken in which case a speech recognition component is also utilized, or in written or typed form), recognize that input, and take a designated action based on the input. Of course, there is a wide variety of inputs which can be received from different users, all of which mean the same thing. Therefore, this and many other applications for natural language processing techniques can benefit from understanding the meaning of a textual input.

While understanding the meaning of a textual input is highly beneficial, the industry has a number of problems in attempting to develop such systems.

The first problem is related to paraphrase identification. Systems have great difficulty in understanding the input text well enough to recognize paraphrase relationships between text segments that "mean the same thing" even though they may not precisely share content words or syntactic structures.

A problem which is closely related to paraphrase identification is that of word sense disambiguation. Nearly all words are polysemous, to some extent, in that they have different shades of meaning, depending on the context in which they are used. These different shades of meaning are often aligned on a continuum so that one shade of meaning blends into another, based on subtle shifts in context. Word sense disambiguation involves the assignment of one or more senses to an ambiguous word in an utterance. The traditional approach to word sense disambiguation is to create a number of "buckets" for each polysemous word, each bucket labeled with an individual sense number. Once the buckets are created, the analyzer attempts to place the word in the textual input in a given bucket, depending on a number of predetermined criteria. This strategy encounters great difficulty in applications such as information retrieval and machine translation, both because (1) word uses do not always conform to these discrete bins, and (2) state-of-the-art disambiguation techniques are quite unreliable.

Another related problem is the requirement that software application developers be allowed to easily customize their applications to accept natural language inputs in order to implement a conversational interface. Traditionally, such developers have simply attempted to think of every possible way that a user may specify or request an application function. When a user input is received, the system attempts to match the user input against one of the possibilities generated by the developer. The problem of matching natural language into program functions is a fundamental one. However, even given its importance, developers cannot exhaustively specify the wide range of utterances users might use to command the application, and how these utterances should map into function calls.

Some methodologies which have been used in the past for paraphrase identification include dictionary-based, example-based, and corpus-based systems. Dictionary based work has focused mainly on the creation of lexical knowledge bases, specifically taxonomies, from machine readable dictionaries. The aim of most example-based research has been to create large example bases, or collections of example relations or phrases, and to develop methods for matching of incoming text to the stored examples. Corpus-based research efforts have used quantitative analyses of text corpora to develop statistical models of the relationships between words, including simple co-occurrence as well as deeper similarity relationships.

SUMMARY OF THE INVENTION

The present invention can be used in natural language processing systems to gain an understanding of a textual input segment, or to identify a relationship (such as similarity in meaning) between two textual segments. The textual segments can be represented by logical graphs. The logical graphs are identified as matching, even if there is an inexact match between the two, so long as the two are determined to be similar.

For instance, in one embodiment, the first graph represents a textual input segment, and the second graph represents information in a lexical knowledge base (LKB).

A relationship between first and second logical graphs can be determined regardless of whether there is an exact match between the first and second logical graphs. The input graph can be matched against the second graph even if the two differ lexically or structurally. The inexact match is identified based on a relationship (such as similarity) between words and relations in the two graphs.

BRIEF DESCRIPTION OF THE DRAWINGS

FIG. 4B illustrates highly weighted semrel paths between "pen" and "pencil".

FIG. 4C illustrates the top weighted matched structure obtained during the procedure set out in FIG. 4A.

FIGS. 4D–4F are flow diagrams illustrating the operation of the system shown in FIG. 2A for the specific applications of information retrieval, machine translation, and natural language interfaces, respectively.

FIG. 6 is a flow diagram illustrating another embodiment of performing a fuzzy match in more detail.

DETAILED DESCRIPTION OF THE ILLUSTRATIVE EMBODIMENTS OVERVIEW

Figure 1:
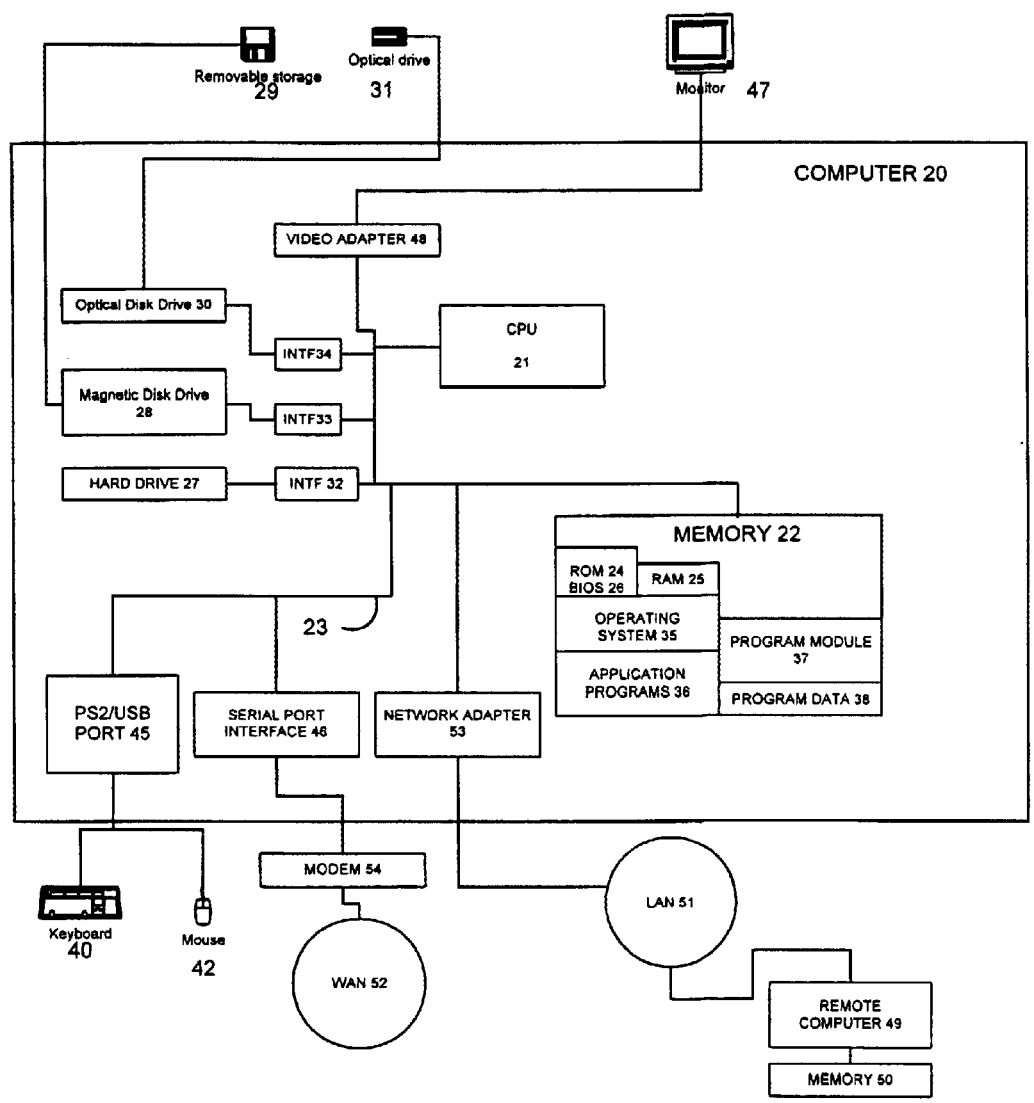
FIG. 1 is a block diagram of a computer system in which the present invention can be used.

The present invention is directed to matching logical graphs which may differ from one another lexically or structurally. A logical relation consists of two words joined by a directional relation type (e.g. Part, Time, Hypernym, Logical-Subject) Prior to beginning a detailed discussion of the present invention, a number of terms used throughout the specification will be discussed. A semantic relation relates the meaning of a pair of words in a well-defined way, using a directional relation type. For example, the following relation indicates that the noun "boat" occurs as the subject of the verb "float":

boat LogicalSubject—float.

This semantic relation is said to have the relation type "LogicalSubject." Relation types include many common relations in meaning, such as: Cause, Domain, Hypernym, Location, Manner, Material, Means, Modifier, Part, Possessor, Purpose, QuasiHypernym, Synonym, Time, LogicalObject, LogicalSubject, and User. A lexical knowledge base, described in greater detail below, contains many such semantic relations. Therefore, semantic relation paths (or simply "paths") may exist between arbitrarily selected pairs of words.

A logical form is a graph of connected logical relations representing a single textual input, such as a sentence. It minimally consists of one logical relation.

In particular, a logical form portrays structural relationships (i.e., syntactic and semantic relationship), particularly argument and/or adjunct relationships, between important words in an input string.

A subgraph (Type A) is a contiguous subset of the connected logical relations in a logical form.

Logical forms are composed by joining nodes with common lexical items.

A logical graph is a single logical form or a composite of logical forms and/or subgraphs.

A subgraph (Type B) is a contiguous subset of the connected logical relations in a logical graph.

A path is a subgraph (Type A or B) in which the logical relations are connected in a linear sequence.

A composite path is a path in which the logical relations come from two different logical forms.

A lexical knowledge base is a collection of logical graphs representing a textual corpus. These logical graphs consist of logical forms for each textual segment in the corpus, which are composed at common words.

For purposes of relating the above-mentioned terms to their equivalents in the works previously incorporated by reference, the following table can be referenced:

TABLE 1

| TERMS IN INCORPORATED REFERENCES | CORRESPONDING TERM USED HEREIN |
|---|---|
| Semantic relation (semrel) | Logical relation |
| Logical form triple | Logical relation |
| Logical form graph or Subgraph thereof | Logical graph or subgraph Thereof |
| Semantic relation structure | Logical form |
| Semantic relation path | Path |
| Extended semantic relation path | Path (specifically, a composite path) |

In one illustrative embodiment, the present invention is directed to matching a logical graph representing a textual input to a logical graph in a lexical knowledge base (LKB). One embodiment of the present invention is also directed to linking the logical graphs in the LKB to external information. The graph matching is performed in a "fuzzy" manner which allows graph matches even when there are structural and lexical differences between the input graph and the logical graph in the LKB. The links between the logical graph in the LKB and the external information can take one of a wide variety of forms, including document offsets or pointers to documents for information retrieval tasks, information used in filling slots in application frames, links to nodes corresponding structures for other languages, possibly residing in another LKB, for machine translation, etc.

The discussion of FIG. 1 below is simply to set out but one illustrative environment in which the present invention can be used, although it can be used in other environments as well.

FIG. 1 is a block diagram of a computer 20 in accordance with one illustrative embodiment of the present invention. FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 45 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Figure 2A:
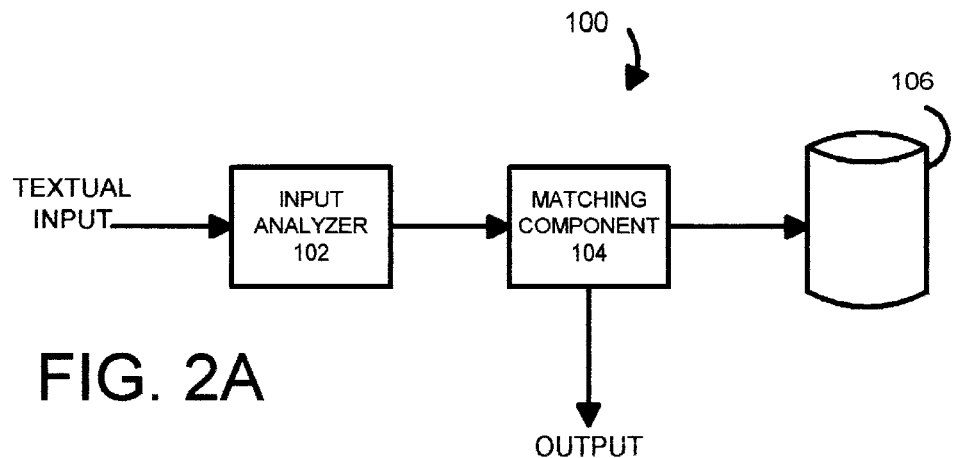
FIG. 2A is a simplified block diagram in accordance with one aspect of the present invention.

FIG. 2A is a block diagram of a matching system 100 in accordance with one illustrative embodiment of the present invention. Matching system 100 includes input analyzer 102, matching component 104 and lexical knowledge base (LKB) 106. It should be noted that all, or a portion of, system 100 can be contained in computer 20 illustrated in FIG. 1. For example, the input analyzer 102 and matching component 104 can be software modules stored in memory 22 as, for example, application programs 36 or program modules 37, or they can be integrated into operating system 35. Similarly, LKB 106 can be stored in memory 22, or on any other storage device, such as hard drive 27, removable storage 29, optical drive 31, or a memory device stored on wide area network 52 or local area network 51.

Figure 2B:
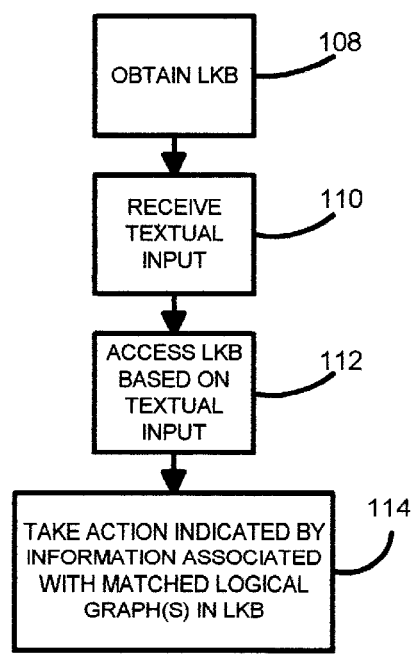
FIG. 2B is a flow diagram illustrating operation of the system shown in FIG. 2A in accordance with one aspect of the present invention.

In any case, the operation of system 100 will be described with respect to FIGS. 2B–2D. While the broad aspects of the present invention are drawn to simply matching logical graphs, the present description proceeds with respect to an illustrative embodiment in which one of the items to be matched represents a textual input and the other is indicative of information in a lexical knowledge base. The first step in matching a textual input against a logical graph in a lexical knowledge base is to obtain the lexical knowledge base 106 shown in FIG. 2A. This is indicated by block 108 in FIG. 2B. Obtaining lexical knowledge base 106 can be done in a wide variety of known manners, and one of those is more specifically set out in FIG. 2C, and will be described in greater detail below.

Once the lexical knowledge base 106 is obtained, system 100 receives a textual input. This is indicated by block 110 in FIG. 2B. It should be noted that the textual input can either be in written or spoken form.

If it is in spoken form, input analyzer 102 includes a speech recognition component which recognizes the spoken words received and reduces them to machine readable form. This can be done in substantially any known manner. If the textual input is in written form, it may typically be provided through a pointing device, a keyboard, a handwriting analysis component, etc.

In any case, once the textual input is in machine readable form, it is analyzed by input analyzer 102. The function of input analyzer 102 is described in greater detail with respect to FIG. 3. Briefly, input analyzer 102 analyzes the textual input and creates a logical form representative of the textual input. This logical form is provided to matching component 104 which accesses information in LKB 106. This is indicated by block 112 in FIG. 2B.

Matching component 104 attempts to match the logical form representing the textual input against logical graphs in LKB 106. Once a match has been found, matching component 104 provides an output which is based on the annotations corresponding to the matched logical graphs in LKB 106. This is indicated by block 114 in FIG. 2B.

Generation of LKB 106

Figure 2C:
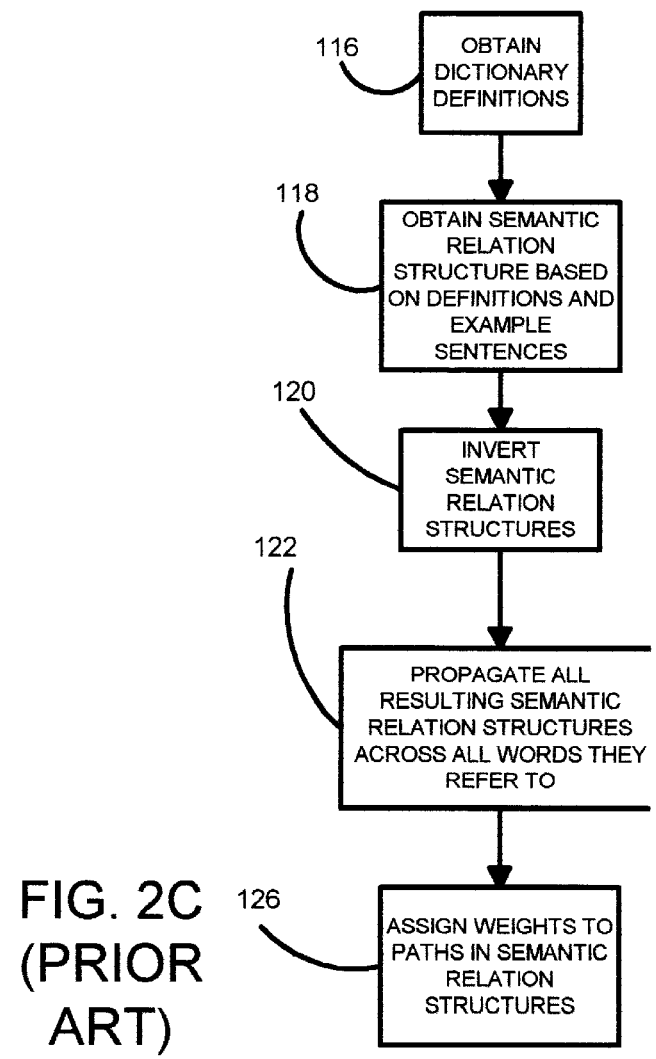
FIG. 2C is a flow diagram illustrating one embodiment of obtaining a lexical knowledge base which is currently known.

FIG. 2C is a more detailed flow diagram illustrating how an LKB 106 is obtained. In the embodiment illustrated, LKB 106 is an automatically constructed resource which includes components of both a computational lexicon and a highly-structured lexical example base, and is known as MindNet developed by Microsoft Corporation of Redmond, Wash. The method of developing the MindNet lexical knowledge base is described in great detail in the above-incorporated documents, and also in a document entitled "MindNet: Acquiring and Structuring Semantic Information From Text", written by Richardson, Dolan, Vanderwende, 1998, and the reader is referred to those documents for a more detailed discussion. However, the method is set forth here briefly for the sake of completeness. Terminological equivalents for this description are stated above in the overview section in Table 1. However, in this section, the terminology used is consistent with that used in the documents incorporated by reference (i.e., on the left side of table 1 (above)).

In one illustrative embodiment, a machine readable dictionary is first obtained. This is indicated by block 116. Next, semantic relation structures are obtained based on the definitions or sentences used in the machine readable dictionary. Such semantic relation structures are obtained by creating a syntax parse tree and a deeper logical form. The logical form processing identifies grammatical roles like logical subject and object, resolves long-distance dependencies, and normalizes some syntactic alternations like active/passive. It also resolves anaphoric references of pronouns. The extraction of semantic relations (semrels) from a definition or example sentence produces a hierarchical structure of these relations, representing the entire definition or sentence from which they came. Such structures are stored in their entirety in LKB 106. The step of obtaining such semantic relation structures is indicated by block 118 in FIG. 2C.

The semantic relation structures are then fully inverted and propagated throughout the entire LKB 106, being linked to every word that appears in them. This is indicated in blocks 120 and 122 in FIG. 2C. In the fully inverted structure stored in LKB 106, all words are cross-linked, no matter where they appear.

Figure 2D:
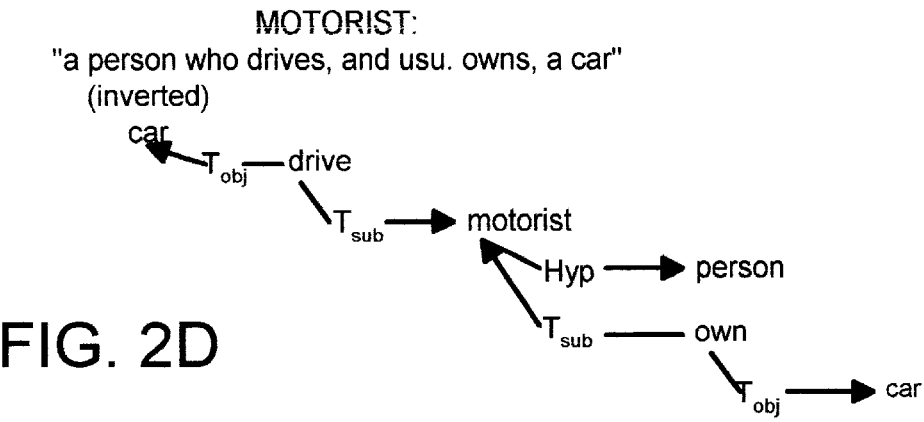
FIG. 2D is an inverted semantic relation structure.

Such an inverted and propagated structure is set out in FIG. 2D. The structure illustrated in FIG. 2D is produced from a definition for "motorist" and is linked to the entry for "car" (appearing as the root of the inverted structure).

Inverted structures facilitate the access to direct and indirect relationships between the root word of each structure, which is the head word for the MindNet LKB entry containing it, and every other word contained in the structures. These relationships, including one or more semantic relations linearly connected together, constitute semrel paths between two words. For example, the semrel path between "car" and "person" in FIG. 2D is:

Car<T_obj-drive-T_sub>motorist-Hyp>person

An extended semrel path is a path created from subpaths in two different inverted semantic relation structures. For example, "car" and "truck" are not related directly by a semantic relation or by a semrel path from any single semantic relation. However, if one allows the joining of the semantic relations car-Hyp-vehicle and vehicle-Hyp-truck, each from a different semantic relation structure, at the word vehicle, the semrel path: "car-Hyp>vehicle-Hyp>truck" results. Adequately constrained, extended semrel paths have proven invaluable in determining the relationship between words in the MindNet LKB that would not otherwise be connected.

Semrel paths are automatically assigned weights that reflect their salience. The weights in the MindNet LKB are based on the computation of averaged vertex probability which gives preference to semantic relations occurring with middle frequency. Additionally, weights are penalized for an extended semrel path which results from joining two semrel paths from different structures. One illustrative weighting technique is set out in detail in the Richardson dissertation incorporated herein by reference. Assigning weights to semrel paths in semantic relation structures is indicated by block 126 in FIG. 2C.

Figure 2E:
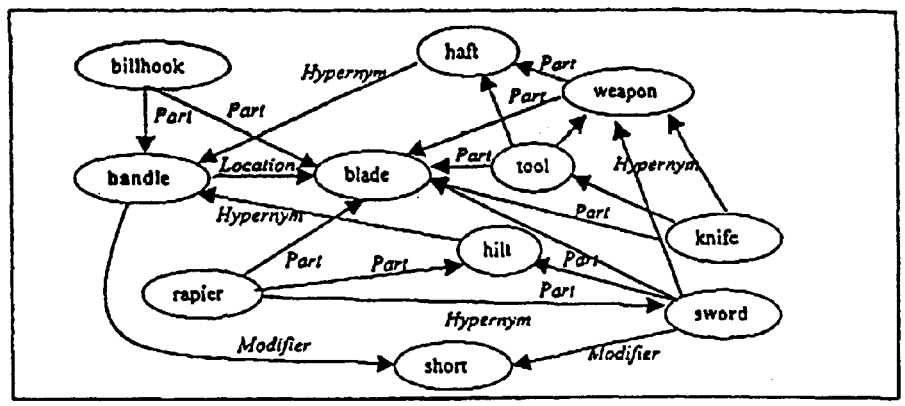
FIG. 2E is a simplified diagram illustrating a portion of a lexical knowledge base in accordance with one embodiment of the present invention.

FIG. 2E represents a fragment of the MindNet LKB. More specifically, FIG. 2E shows the fragment of the MindNet LKB that is directly associated with the top-weighted semrel paths linking the words "handle" and "sword". The fragment exhibits complex chains of labeled relationships. Of course, FIG. 2E is a simplified illustration as the weights, and other graph structures and annotations have been eliminated from the figure for the sake of clarity.

Processing the Input and Accessing the LKB

Figure 3A:
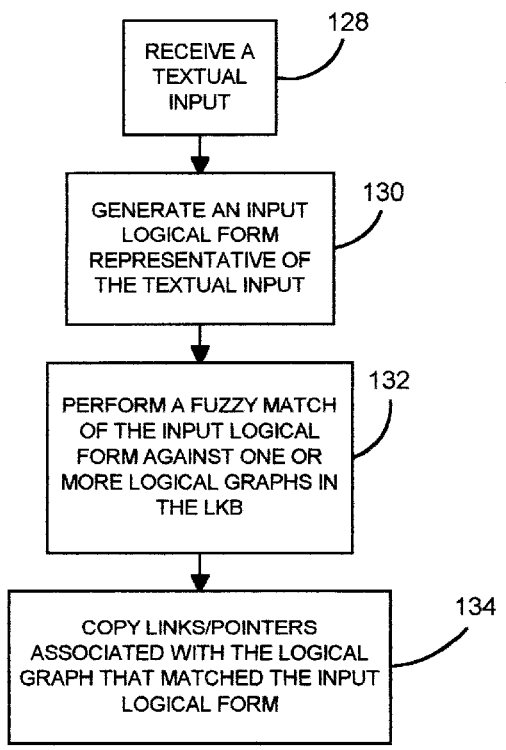
FIG. 3A is a more detailed block diagram illustrating the operation of the system shown in FIG. 2A in accordance with one aspect of the present invention.

FIG. 3A is a more detailed flow diagram of receiving the textual input and accessing the LKB in accordance with one illustrative embodiment of the present invention. The textual input is received as discussed above with respect to FIG. 2A. This is indicated by block 128 in FIG. 3A.

A logical form is then generated which is indicative of the textual input. Of course, the textual input can be a sentence fragment, a full sentence, or some larger discourse unit. In any case, the input logical form is created and represents an analysis of the textual input.

Figure 3B:
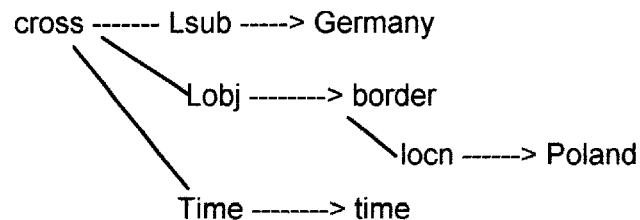
FIG. 3B is a graph structure for a textual input formed in accordance with one embodiment of the present invention.

For example, in an information retrieval application, the textual input may typically be a query, such as: "When did Germany cross the border of Poland?" FIG. 3B illustrates but one embodiment of a logical form which represents that textual input. The logical form illustrates the logical relationships between the content words in the query. Generating an input logical form indicative of the textual input is indicated by block 130 in FIG. 3A.

Next, matching component 104 (shown in FIG. 2A) performs a "fuzzy match" of the input logical form generated at block 130 against one or more logical graphs in LKB 106. The fuzzy matching technique used, in accordance with one embodiment of the present invention, would locate a text fragment such as:

Hitler invaded Poland's border in 1939.

Figure 3C:
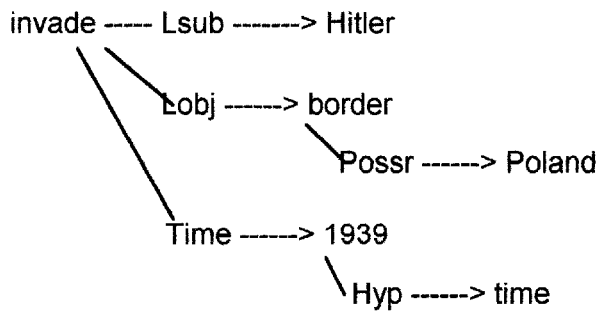
FIG. 3C is a graph structure contained in an LKB in accordance with one embodiment of the present invention.

The corresponding logical graph for the above answer is illustrated in FIG. 3C. It should be noted that this logical graph is a composite of logical forms stored in the LKB 106. Of course, the logical graph for the answer illustrated in FIG. 3C is not identical to the logical form for the query illustrated in FIG. 3B. However, the fuzzy matching technique used in accordance with one aspect of the present invention would identify the logical graph illustrated in FIG. 3C as a matching graph. Performing the matching technique is discussed in greater detail with respect to FIG. 4A below, and is indicated by block 132 in FIG. 3A. The matching technique allows matches between graphs even when there are structural or lexical differences between them.

Once the matching logical graph in the LKB is located, any pointers or links associated with these graphs are copied to the input logical form. This annotated logical form, which is used by applications to perform appropriate actions, is the output of this matching procedure. This is indicated by block 134 and is discussed in greater detail with respect to FIGS. 4D–4F below. Such pointers or links can include, for example, document offsets which identify a textual fragment (s) that spawned the matched logical graph, corresponding graphs for other languages possibly residing in another LKB for machine translation, or fillers for slots in a semantic frame.

Fuzzy Matching

Figure 4A:
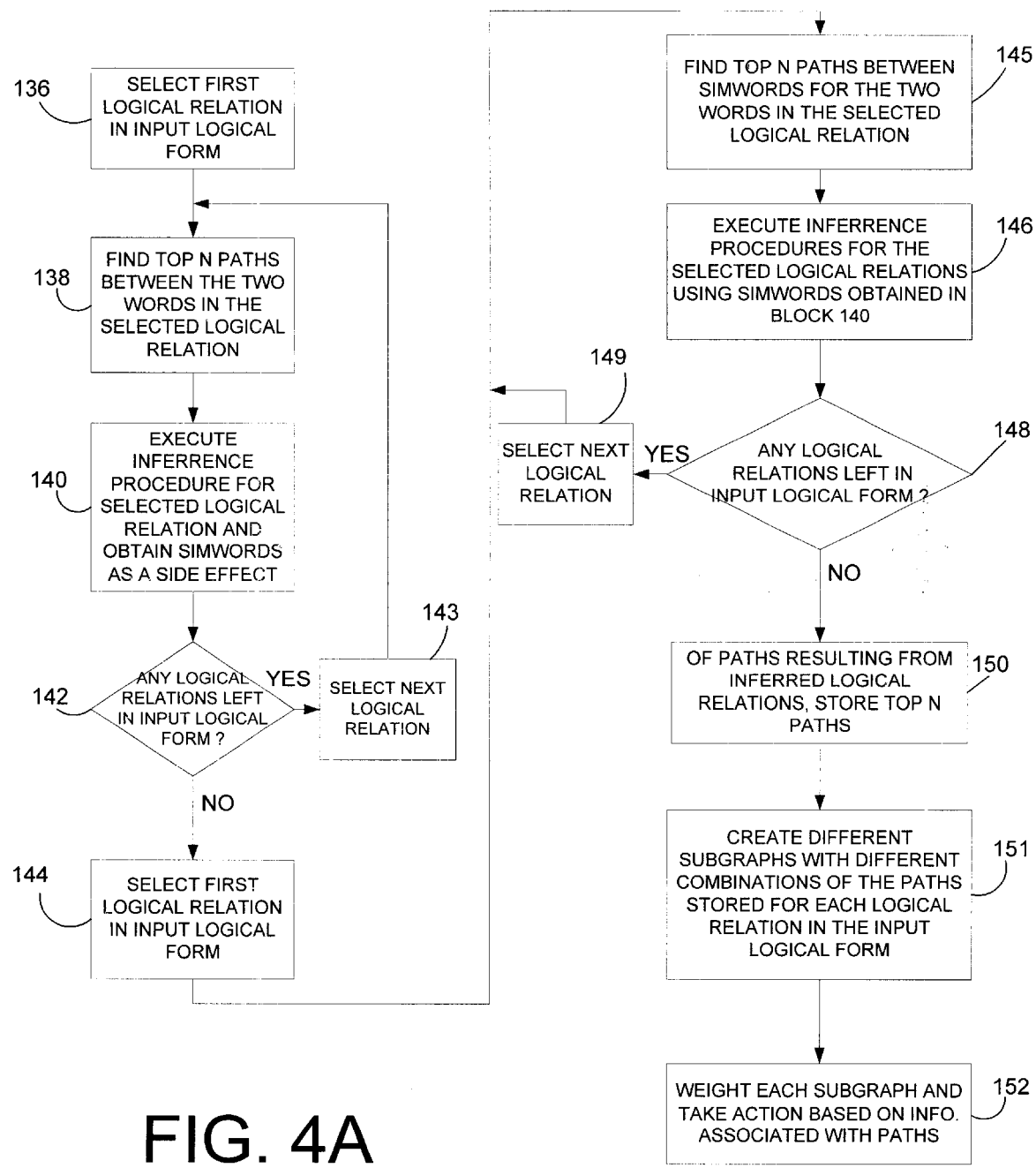
FIGS. 4A is a flow diagram illustrating performing a fuzzy match in more detail.

FIG. 4A is a flow diagram which illustrates the matching technique in accordance with one illustrative embodiment of the present invention. Matching component 104 first selects a first logical relation in the input logical form (such as that shown in FIG. 3B) which has been generated based on a textual input.

By way of example, the first selected logical relation can be that designated "cross-Lsub>Germany". The two content words in that logical relation are "cross" and "Germany". Matching component 104 then locates in the LKB the n top weighted paths between the two content words in the selected logical relation. In other words, there may be many different paths between "cross" and "Germany" in the LKB, each having an associated weight. The number n can be any desired integer.

For example, instead of simply finding the logical relation "cross-Lsub>Germany", the matching component may find a highly weighted path between "cross" and "Germany" as follows:

cross-Lsub>Hitler-Possr>Germany

After the top n paths are located, matching component 104 may infer logical relations and determine the similarity between words in the selected logical relations in the input logical form (in this case the logical relation "cross-Lsub>Germany") and words in the identified n paths which are not found in the input logical form. One way of doing this is set out in the above-referenced and incorporated documents entitled DETERMINING SIMILARITY BETWEEN WORDS, and INFERRING SEMANTIC RELATIONS. Thus, in the above example, the matching component 104 would determine a similarity between "Hitler" and "Germany".

Although one illustrative embodiment for inferring semrels and determining similarity is described in greater detail in the above-identified and incorporated dissertation and patent applications, it is summarized here for the sake of clarity. This summary will again use the historical terms found in the incorporated references (i.e., the terms on the left of Table 1 in the Overview section above). Briefly, the technique integrates both syntagmatic and paradigmatic information into a single repository or LKB. The similarity procedure is based on the top-ranked (by weight) paths between the words. For example, some of the top ranked paths in the MindNet LKB between the word "pen" and the word "pencil" are shown in FIG. 4B. In the example illustrated in FIG. 4B, a pattern of semrel symmetry clearly emerges in many of the paths. This observation of symmetry has led to an understanding that similar words are typically connected in the MindNet LKB by paths that frequently exhibit certain patterns of relations (exclusive of the words they actually connect) many patterns being symmetrical, but others not.

In order to determine similarity between two words, by exploiting the pattern of semrel symmetry, one illustrative embodiment of the present invention involves a training phase for identifying and weighting the path patterns observed, and a similarity determination phase for determining the level of similarity between pairs of words using the path pattern weights determined in the training phase. In the training phase, a pair of synonyms is obtained, and, for each synonym pair, the most salient pairs connecting the synonym pairs are identified. The path pattern of each such path is extracted, and the frequency with which these path patterns occur is counted. This frequency, called a path pattern frequency or path pattern weight, characterizes the tendency of each path pattern to indicate the similarity of words that are connected by paths having the path pattern.

In the similarity determination phase, matching component 104 receives as an input, the pair of words for which similarity is to be determined, and quantitatively determines the similarity of the input words. Matching component 104 identifies the most salient paths between the input words and extracts the path patterns for these paths. Matching component 104 then determines the frequency counted during the training phase for each extracted path pattern, and computes the average of these frequencies. This average frequency represents a relative measure of the similarity of the input words. This same process can be applied to quantitatively determine the relative level of similarity between two senses of the same word.

The salient semantic relation path generator used by matching component 104 to identify the most salient semantic relation paths between two words illustratively derives these most salient paths from a lexical knowledge base compiled automatically for a particular subject matter domain from a corpus of documents that are representative of the subject matter domain. One illustrative implementation of such a salient semantic relation path generator is described in detail in U.S. patent application Ser. No. 08/904,418, entitled "IDENTIFYING SALIENT SEMANTIC RELATION PATHS BETWEEN TWO WORDS," which is referenced above.

In other words, an inference procedure has been developed which allows semantic relations not presently in the MindNet LKB to be inferred from those that are. This procedure is also set out in greater detail in the document referenced above, and in the application entitled INFERRING SEMANTIC RELATIONS, both of which are incorporated by reference. Briefly, the procedure exploits the top-ranked paths between the words in the relation to be inferred. For example, if the relation "watch-Means>telescope" were not in the MindNet LKB, it could be inferred by first finding the paths between "watch" and "telescope", and examining those paths to see if another word appears in a "Means" relation with "telescope". If so, similarity between that word and the word "watch" is determined as discussed above. As it turns out, the word "observe" satisfies these conditions in the path:

watch-Hvp-observe>Means>telescope

Therefore, it may be inferred that one can "watch" by "means" of a "telescope".

The description now proceeds with the corresponding term equivalents found on the right side of Table 1 in the Overview above. In the example given above with respect to FIGS. 3B and 3C, the words "Hitler" and "Germany" are determined to be similar as a side effect of inferring the logical relation between "cross" and "Germany". Therefore, the word "Hitler" would be identified as a similar word or "simword". Inferring this logical relation between "cross" and "Germany" is indicated by the process in block 140.

Next, matching component 104 determines whether there are any remaining logical relations in the input logical form which have not been inferred. This is indicated by block 142 in FIG. 4A. If so, matching component 104 selects the next logical relation (as indicated by block 143) and repeats the steps indicated by blocks 138 and 140 for each of the logical relations in the input logical form. For instance, the second logical relation "cross-Lobj>border" would next be inferred. Assuming that the path "cross-HypOf>invade-Lobj>border" is found in the LKB, matching component 104 conducts a similarity analysis between the words "cross" and "invade" and finds that they are similar, thus labeling "invade" as another simword.

For the sake of the present example, it is assumed that matching component 104 does not find any top weighted paths between the words "cross" and "time", but that it does find the path consisting of the single logical relation "border-possessor>Poland" for the logical relation "border Locn-Poland". Although these two logical relations are not identical, they can be identified as being in a paraphrase relationship. The "border-Possr>Poland" logical relation is thus identified as a structural paraphrase of the input logical relation.

The search is then expanded by using the simwords identified in the previous steps. Thus, for example, using the simword "invade" for the term "cross" and the simword "Hitler" in place of "Germany", matching component 104 identifies the path consisting of the single logical relation "invade Lsub>Hitler". Further, since the terms "cross" and "invade" have been determined to be similar, matching component 104 identifies the single logical relation path "invade-Lobj>border". In addition, substituting the term "invade" for "cross" for the third path ("cross-Time>time") matching component 104 identifies the path "invade>Time-1939-Hyp>time". Expanding the search in this way using simwords is illustrated by blocks 144–149 in FIG. 4A.

Briefly, the first logical relation in the input logical form is selected as indicated by block 144. The top n paths between simwords for the two corresponding words in the selected logical relation are found. This is indicated by block 145. The inference procedure is then executed for the selected logical relations using the simwords identified in block 140. This is indicated by block 146. If any logical relations remain in the input logical form, the next logical relation is selected and the processing reverts to block 145. This is indicated by blocks 148 and 149. If no logical relations remain in the input logical form, processing continues at block 150.

After the steps of expanding the search using simwords and inferring logical relations have been accomplished, matching component 104 retains the top n paths resulting from the inference of each logical relation. This is indicated by block 150 in FIG. 4A. Matching component 104 then creates different output logical graphs consisting of different combinations of the paths which resulted from inferring each logical relation in the input logical form. This is indicated by block 151. The output logical graphs are weighted in the same way as logical forms are when creating the LKB (discussed in greater detail with respect to FIG. 2C). This is indicated by block 152.

The top m output logical graphs are retained. For example, FIG. 4C illustrates the top weighted logical graph obtained during the procedure set out in FIG. 4A. It can be seen that the graph structure illustrated in FIG. 4C is isomorphic to that illustrated in FIG. 3C. In order to determine which logical graphs to retain, a weighting mechanism is used. In accordance with one aspect of the present invention, two factors contribute to the weight of a logical graph: (1) the weight of the paths resulting from the inference of each logical relation in the input logical form, and (2) whether the logical relations in the resulting logical graph come from the same logical form. Logical graphs that contain logical relations from the same logical form will have higher weights.

Using the Results of The Match

Figure 4F:
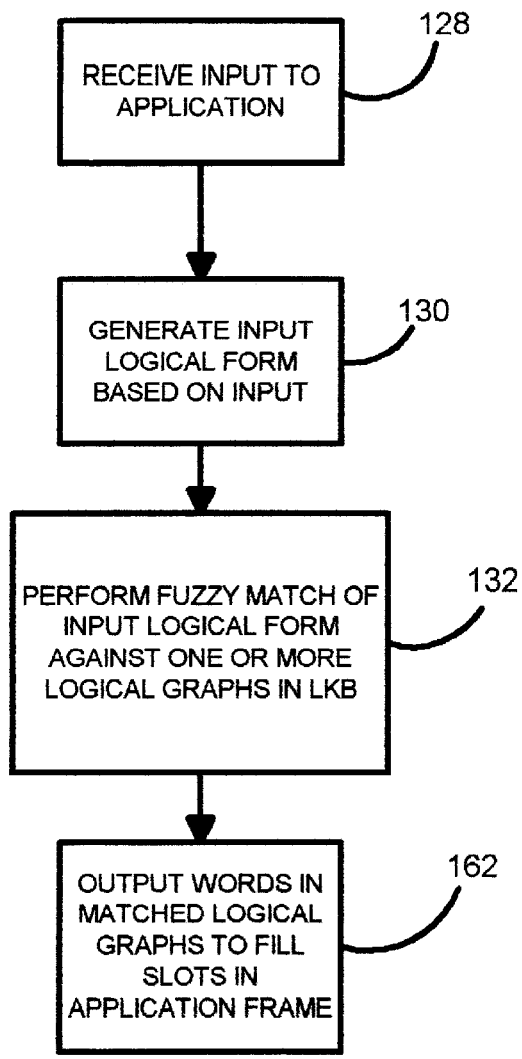

After the fuzzy match is accomplished, the resulting logical graph, composed from logical graphs in the LKB, may have associated pointers or links which can be used to accomplish a desired task. Some such tasks are illustrated in FIGS. 4D–4F.

FIG. 4D is a flow diagram illustrating an information retrieval operation application in accordance with one embodiment of the present invention. A number of the blocks illustrated in FIG. 4D are similar to those illustrated in FIG. 3A and are similarly numbered. Therefore, the input query is received, and a query logical form is generated based on the input query. This is indicated by blocks 128 and 130. Next, a "fuzzy match" is performed, matching the query logical form against one or more logical graphs in the LKB. This is indicated by block 132. Once the fuzzy match has been accomplished, matching component 104, or another component, outputs (1) the actual text which spawned the matched logical graph in the LKB, (2) the document which contains that text, or (3) a pointer to the text or document which spawned the matched logical graph in the LKB. This is indicated by block 154.

The textual input can also be used to accomplish a document clustering operation in which an entire document is fed into the analyzer and is placed in a cluster of similar documents. Similarly, the system can be used to execute a "Find Similar" type of operation. In that application, a text corpus is provided to the analyzer and a request is provided that the system find similar types of documents. Other applications can be implemented as well.

FIG. 4E is a flow diagram illustrating the operation of system 100 in performing a machine translation task. In that application, a textual input in language A is received and is to be translated into language B. This is indicated by block 128. An input logical form is then generated based on the textual input received at block 128. This is indicated by block 130. A fuzzy match is performed between the input logical form and one or more logical graphs in an LKB which has been generated in language A. This is indicated by block 132.

A number of things can be done next. For example, the LKB in language A can include translation information for translating inputs into language B. Matching component 104 can thus output information, associated with the matched logical graphs in the LKB, which is indicative of a translation of the textual input into language B. Alternatively, matching component 104 can output links to logical graphs in an LKB in language B wherein the links are associated with the matched logical graphs from the LKB in language A.

In this way, text in language B that spawned the associated logical graphs can be located. This text will have the same or similar meaning as the input to be translated. This is indicated by block 156. As still another alternative, matching component 104 can output a pointer to the text that spawned the logical graphs pointed to in the LKB in language B. This is indicated by block 158. Alternatively matching component 104 can output the actual text that spawned the logical graphs pointed to in the LKB in language B. This substantially amounts to a preliminary translation of the textual input in language A. This is indicated by block 160. Additional processing may be required to produce a more polished translation from this output.

FIG. 4F is another diagram illustrating a natural language interface application. Some applications are designed to do one or more tasks, and to accomplish those tasks based on a natural language input command. For example, a scheduling application may have a natural language interface which allows appointments to be generated based on natural language inputs. Similarly, a multimedia application may allow the user to provide a natural language input to control a compact disc player (such as to select a compact disc and play a given track on that disc).

The application program developer can provide links in the LKB that cause certain actions to be taken. As an example, an input such as "I want to set up a meeting with John at noon." might match an LKB logical form spawned by a developer's description "Someone [SCHEDULER] can schedule an appointment: [ACTIVITY] with someone [SCHEDULEE] at a time [TIME]." This match thus provides the scheduling application with the information it needs to build an appointment: "SCHEDULER=I", "ACTIVITY=meeting", "SCHEDULEE=John", and "TIME=noon".

Therefore, in order to accomplish such an implementation, the natural language textual input is first received as indicated by block 128. An input logical form is generated based on a natural language textual input as indicated by block 130 and a fuzzy match is performed between the logical form and one or more logical graphs in the LKB. This is indicated by block 132. The output from the matching system can, in the illustrative embodiment, be words with links from the matched logical graphs which are used to fill slots in application frames. This is indicated by block 162 in FIG. 4F.

Figure 5:
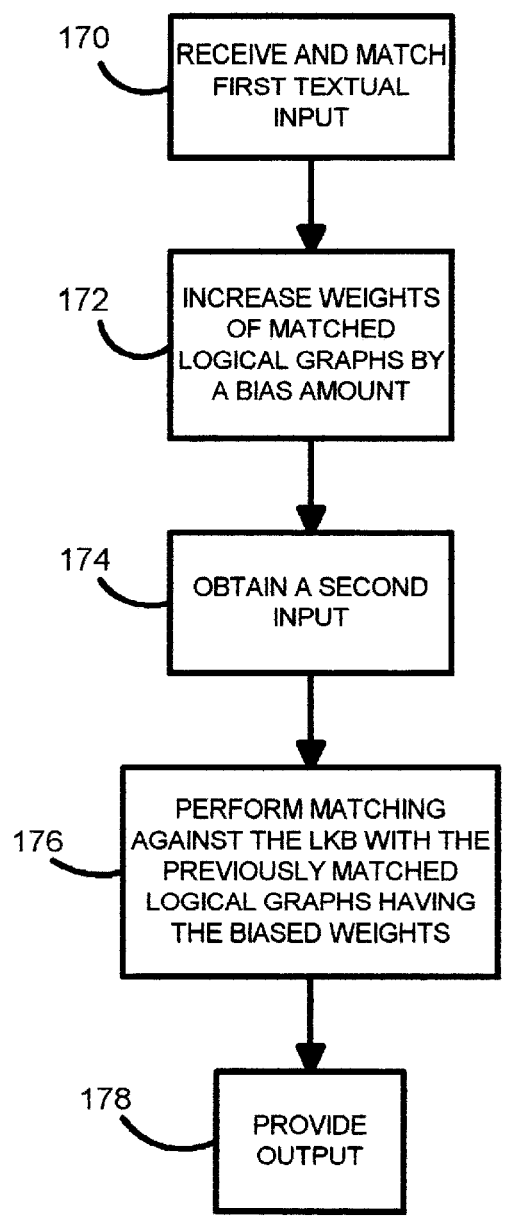
FIG. 5 is a flow diagram illustrating a priming operation in accordance with one aspect of the present invention.

FIG. 5 illustrates another technique which is performed in accordance with one illustrative embodiment of the present invention. The technique is referred to herein as priming. Priming is used to adjust the weights of logical graphs in the LKB so that these become preferred matching targets during the fuzzy matching process. In this way, the LKB is "primed" to expect certain sorts of inputs and the fuzzy matching process focuses its search on the paraphrase space around these areas in order to try to identify a match.

By way of example, assume that the textual input is a natural language input to a computer system which schedules appointments. Also, assume that the first natural language input is "I want to schedule an appointment with John at noon." Based on that input, the matching process will match the logical graphs in the LKB, which are related to scheduling an appointment. The weights on these logical graphs are then primed or increased. Therefore, if an immediately subsequent natural language input is "Make that in the library" the matching process will focus on the area of the LKB related to scheduling appointments with the scheduler application, rather than on other domain areas. The result will be that "library" will likely to be interpreted as the location of the meeting.

The priming process can be performed as illustrated by the flow diagram set out in FIG. 5. The system receives and matches a first textual input as indicated by block 170. After the textual input is matched to an area in the LKB, the weights of the matched extended paths or logical graphs in the LKB are increased by a bias amount. This is indicated by block 172. Increasing the weights in this way effectively biases the LKB to look for certain types of inputs.

A second textual input is then obtained. This is indicated by block 174. The second textual input is processed to obtain a second input logical form which is matched against the LKB with the previously matched logical graphs having the biased weights. The system thus illustrates a preference for matching against the logical graphs having the increased weights. This is indicated by block 176. Once the second input logical form is matched against logical graphs in the LKB, an appropriate output is provided. For example, in the illustrative embodiment discussed above, the appointment can be created with a location "library". Providing the output is indicated by block 178.

FIG. 6 is a flow diagram illustrating another embodiment of performing a fuzzy match in accordance with one aspect of the present invention. The input logical form is first obtained by matching component 104. This is indicated by block 200.

Next, a starting point in the input logical form is identified by component 104. This is indicated by block 202. The starting point is illustratively identified by examining the words at each node in the input logical form. The starting point may illustratively be the "most unique" node, where uniqueness can be determined in any number of suitable ways. For example, uniqueness can be determined based on the word's frequency in a text corpus, the number of logical forms in the LKB in which the word participates, the number of simwords it has, the total frequency of the word and its simwords in a corpus, the total number of logical forms in the LKB in which the word and its simwords participate, whether the word is a proper noun, etc. Any such method, or combination of methods, may be used.

Once the starting point is identified, the input logical form is inverted such that the word identified as the starting point is the root of the logical form. This is indicated by block 204.

All of the simwords for the new root are then located. This is indicated by block 206. This can also be done in any number of suitable ways, such as by using a thesaurus to find the simwords, examining the logical graphs in the LKB that the word participates in and applying similarity patterns against the paths in the logical graphs as discussed above. It should be noted that some of these methods can produce a relatively large number of simwords. Therefore, the number can be constrained in one of several ways, such as by restricting words identified as simwords by part of speech, by restricting path formation to logical graphs extracted from closely related data (such as within the same encyclopedia article etc.), or any number of other ways. Also, a number of the simword identification methods and heuristics can be applied to extend or restrict the number of simwords found for the root node. The simwords are illustratively scored by degree of similarity, which can also be done in any number of suitable ways. For example, the degree of similarity can be identified by the weight of the similarity pattern applied to obtain the similarity, the weight of the path in which the similarity pattern was found, a combination of these techniques, or any other suitable technique.

Once the root word of the input logical form and its simwords have been obtained, the algorithm identifies a candidate set of logical forms in the LKB that have the root word of the input logical form or one of its simwords as their roots. The algorithm next attempts to match the input logical forms against the logical forms in this candidate set. This is indicated by blocks 208 and 209. In one illustrative embodiment, the candidates are searched in order, with those containing the original words in the input logical form searched first and then those containing the most similar words, followed by those with the next most similar words, and so on, with those containing the least similar words compared last. Of course, the search can be terminated at any time if a sufficient number of suitable matches have been found, where suitable can mean matches whose total score exceeds some defined threshold.

For each located logical form, the match against the input logical form proceeds by examining words on nodes and relation types in the input logical form and comparing those to the words on the nodes and the relation types in the logical form in the LKB which is currently under examination.

In one illustrative embodiment, matches for words on nodes in the logical form are made as follows: if the word in the input logical form and the corresponding word in the logical form in the LKB are identical the match is given a perfect score. Other matches, including (but not limited to) those listed below are scored with decreasing values as the degree of match decreases. The following list describes a number of examples of possible types of word matches:

1. The words on a node in the input logical form, or the words on a node in the logical form in the LKB, may match a sub-component of the other word (e.g., Lincoln matches President Lincoln).
2. The question word "who" can match any word that has a Hypernym of "person", or that has some appropriate features, such as [+human], [+first name], [+last name], etc. In one illustrative embodiment, these features are identified during parsing of the text which spawned the logical form being examined.
3. The question word "when" can match any word that has a Hypernym of "time" or "date", or that has some appropriate feature, such as [+time], [+AM], [+PM], [+Date], etc.
4. The question word "where" can match any word that has a Hypernym of "place", or has some appropriate feature, such as [+location], etc.
5. Other question words, such as "how", "what", or "why" can match words with other appropriate Hypernyms or features.
6. A personal pronoun such as "I", "you", "he", "she", "we", "they", can match any word that has a Hypernym "person", or that has some appropriate feature, such as [+human], [+first name], [+last name], etc.
7. A word that has a feature such as those listed above can match a word that has the same or compatible feature.
8. A personal pronoun can match the same or another different personal pronoun.
9. The word under examination in the input logical form and the word in the logical form in the LKB may be similar to each other, the similarity being determined and scored as discussed above.

Some of these matches may be less favorable than others, and their relative score can be correspondingly adjusted. Of course, scoring can be determined in a number of ways, such as set by hand using a linguist's intuition, or learned through a machine-learning algorithm, (e.g. Bayes networks) based on gathered statistics, etc.

Matching relation types can be performed in the following manner. If the relation types in the input logical form and the corresponding relation types in the logical form in the LKB are identical, the match is given a perfect score. Other matches, including (but not limited to) those listed below, can be scored with decreasing values as the degree of match decreases. The list below describes some of the possible types of relation type matches:

1. Any relation type can be matched to another relation type that is considered a paraphrase of it. For example, under certain conditions, Lsub and Lobj can be considered paraphrases of each other. Similarly Locn, Possr and Part can be paraphrases of each other as well.
2. A relation type can also be matched to a longer pattern that may contain more than one relation type and one or more intervening words. For example, X—LsubOf—have—Lobj—Y can be matched to X—Possr—Y. Also, X—LsubOf—be-Lobj—Y can be matched to X—Equiv—Y or X—Hyp—Y.

These paraphrase patterns can have varying scores. The paraphrase patterns and their associated scores can be discovered in one of several ways. For example, a corpus can be trained using a pair of words known to be linked by a specific relation type (the word pairs and relation types between them can be vetted by hand to create the corpus, for instance). Then the path algorithm described above can be run to obtain all paths between each word pair in the LKB. The patterns of relation types linking words in these paths are used to learn what patterns most reliably provide a paraphrase for the known relation type between the two words. It should be noted that this is a generalization of the method used to discover similarity patterns which is described above, in that instead of discovering patterns between words that are known to be synonyms of one another, this technique discovers such patterns for any desired relation types.

Once the search for matches has been completed, the overall score for a match between the input logical form and a logical form in the LKB is determined by combining the individual scores for both word and relation type matches. Words of relationships that have no match are given an arbitrarily low score. This is indicated by block 210. In one illustrative embodiment, these scores are simply multiplied together (or the log of the scores are added together).

An ordered list of matches is illustratively maintained. When a specified number of matches with scores exceeding a desired threshold is found, the search procedure terminates. The output of the matching procedure is a copy of the matched portion of the most highly scored matching logical forms in the LKB. Of course, associated with these matched logical forms there may be application-specific data items to aid in an application task, such as pointers to documents, etc., as described above.

It should also be noted that the method described in FIG. 6 may be refined for some applications, for processing larger sentences. In the refinement, the input text is broken up at clause boundaries, and each clause is matched separately, using the above-described matching technique. The best matches for each of the clauses are then combined to provide a list of overall best matches.

Alternatively, instead of breaking the input a priori, the matching technique can be run on the whole input, after which, portions of the input remain unmatched. A new input logical form can be created by removing from the old input logical form the portions that were successfully matched. The matching algorithm can then be run on the new (reduced) input logical form. By repeated application of this procedure until no new matches are found, an entire, large, multi-clausal input can be matched against multiple logical forms (i.e., logical graphs) in the LKB.

It can thus be seen that the result of the fuzzy matching process of the present invention is a set of highly-weighted logical graphs which are associated with links that identify translation equivalents, links to text fragments that spawned the matched logical graphs, or links to a specific system action. This matching process exploits the rich mutual linguistic constraints that exist between an input logical form and logical graphs within the LKB.

It can be seen that the present invention specifically addresses paraphrase identification, word sense disambiguation and customization for conversational interfaces. The present invention can be beneficially implemented in a wide variety of applications.

Although the present invention has been described with reference to preferred embodiments, workers skilled in the art will recognize that changes may be made in form and detail without departing from the spirit and scope of the invention.

What is claimed is:

1. A method of determining a relationship between a first textual segment and textual information in a lexical knowledge base (LKB) having a plurality of interconnected logical graphs, each representative of a textual segment in a corpus, the method comprising:
    obtaining in an input logical form based on the first textual segment;
    matching the input logical form against the logical graphs in the LKB, identifying logical graphs as matching logical graphs even if the matching logical graphs differ from the input logical form lexically or structurally; and
    providing an output based on the matching logical graphs.

2. The method of claim 1 wherein obtaining an input logical form comprises:
    obtaining a set of logical relations indicative of the first textual segment, each logical relation including at least first and second words connected by a relation.

3. The method of claim 2 wherein matching, comprises:
    selecting a logical relation in the input logical form;
    identifying a set of paths in the LKB which connect the first and second words of the selected logical relation;
    determining whether each word in the identified
    determining whether each word in the identified paths, other than the first and second words in the logical relation, is similar to the first or second word in the logical relation and, if so, identifying the word in the path as a similar word (simword); and
    identifying additional matching logical graphs based on the simwords identified.

4. The method of claim 3 and further comprising:
    repeating the steps of selecting a logical relation, identifying a set of paths, determining whether each word in the identified paths are similar to the first or second word in the selected logical relation, and identifying additional matching logical graphs, for each logical relation in the input logical form.

5. The method of claim 3 wherein matching further comprises:
    selecting one or more of a plurality of different combinations of the matching logical graphs and additional logical graphs as selected matching logical graphs, and wherein providing an output comprises providing the output based on the selected matching logical graphs.

6. The method of claim 5 wherein selecting comprises:
    weighting each of the plurality of different combinations with a weighting value; and
    selecting the selected matching logical graphs based on the weighting values.

7. The method of claim 6 wherein the LKB includes translation information indicative of a translation from a first language to a second language and wherein providing an output comprises:
    providing the translation information associated with the selected matching logical graph.

8. The method of claim 6 wherein the LKB is based on a first language, and wherein providing an output comprises:
    providing a link to a logical graph in a second LKB which is based on a second language different from the first language.

9. The method of claim 8 wherein providing an output comprises:
    providing a textual output corresponding to a textual segment used in generating the logical graph pointed to in the second LKB.

10. The method of claim 8 wherein providing an output comprises:
    providing a pointer to a textual output corresponding to a textual segment used in generating the logical graph pointed to in the second LKB.

11. The method of claim 6 wherein providing an output comprises:
    providing a pointer to a textual segment which was used in generating the selected matching logical graph.

12. The method of claim 6 wherein providing an output comprises:
    providing a textual segment which was used in generating the selected matching logical graph.

13. The method of claim 6 wherein providing an output comprises:
    providing an input to an application program.

14. The method of claim 13 wherein the application program includes one or more frames to be filled and wherein providing an input to an application program comprises:
    providing a textual input to fill a frame in the application program.

15. The method of claim 13 wherein the selected matching logical graph contains links to modules causing frames in the application program to be filled, and wherein providing an output comprises:
    providing the links, along with the words in the input logical form, to fill the application program frames with the words.

16. The method of claim 5 and further comprising:
    receiving an nth textual segment;
    obtaining an nth input logical form based on the nth textual segment; and
    preferentially matching the nth logical form against logical graphs in a portion of the LKB proximate to the selected matching logical graph(s).

17. The method of claim 16 wherein selecting one of a plurality of different combinations comprises:
    weighting each of the plurality of different combinations with a weighting value; and selecting the selected matching logical graph based on the weighting values.

18. The method of claim 17 wherein preferentially matching comprises:
    increasing the weighting values associated with the selected matching logical graph.

19. The method of claim 1 and further comprising:
    prior to matching, identifying a starting point in the input logical form; and
    if the starting point is not a root of the input logical form, reconfiguring the input logical form such that the starting point comprises a root of the input logical form.

20. The method of claim 19 wherein matching comprises:
    identifying words in the LKB which are similar to the root (simwords); and
    matching the input logical form against the root and simwords in the LKB.

21. The method of claim 20 wherein identifying simwords comprises:
    accessing a thesaurus.

22. The method of claim 20 wherein identifying simwords further comprises:
    scoring simwords based on a degree of similarity.

23. The method of claim 20 wherein identifying simwords comprises:
    restricting words identified as simwords based on part of speech or based on whether the paths used to identify the simwords came from logical graphs related to a context surrounding the input.

24. The method of claim 19 wherein matching further comprises:
    matching the words and relations in the input logical form against logical graphs in the LKB, to obtain one or more matching logical graphs.

25. The method of claim 24 wherein matching further comprises:
    identifying a candidate set of logical graphs in the LKB having, as a root, the root word of the input logical form, or a simword.

26. The method of claim 25 wherein matching further comprises:
    ordering the candidate set of logical graphs based on whether each candidate in the set of logical graphs contains words in the input logical form or simwords and the number of simwords contained; and
    matching against the candidate set in order.

27. The method of claim 25 wherein matching further comprises:
    selecting a logical graph in the candidate set;
    comparing words on nodes and relation types in the input logical form to words on nodes and relation types in the selected one of the logical graphs in the candidate set; and
    repeating the steps of selecting and comparing a plurality of times.

28. The method of claim 27 wherein comparing relation types comprises:
    identifying relation types in the selected logical graph in the candidate set which are identical to relation types in the input logical form; and
    assigning a highest score to the identical match of relation types.

29. The method of claim 27 wherein comparing relation types comprises:
    identifying relation types in the selected logical graph in the candidate set which are paraphrases of relation types in the input logical form; and
    assigning a score to the match of relation types that is lower than a score for an identical match of relation types.

30. The method of claim 27 wherein comparing relation types comprises:
    matching patterns of subgraphs in the selected logical graph in the candidate set with patterns of subgraphs in the input logical form.

31. The method of claim 27 wherein comparing words on nodes comprises:
    identifying words on nodes in the selected logical graph in the candidate set which are identical to the words on nodes in the logical form; and
    assigning a highest score to the identical match of words.

32. The method of claim 27 wherein comparing words on nodes comprises:
    identifying words on nodes in either the input logical form or the selected logical graph which are subcomponents of the other and thus partially match the other; and
    assigning a score to the partial match of words.

33. The method of claim 27 wherein comparing words on nodes comprises:
    matching "who" with any word representing a human or animate entity; and
    assigning a score to the match.

34. The method of claim 27 wherein comparing words on nodes comprises:
    matching "when" with any word representing a time or date entity; and
    assigning a score to the match.

35. The method of claim 27 wherein comparing words on nodes comprises:
    matching "where" with any word representing a location entity; and
    assigning a score to the match.

36. The method of claim 27 wherein comparing words on nodes comprises:
    matching question words with words having a corresponding feature; and
    assigning a score to the match.

37. The method of claim 27 wherein comparing words on nodes comprises:
    matching personal pronouns with any personal pronouns or words referring to a human or animate entity, or having a corresponding feature; and
    assigning a score to the match.

38. The method of claim 27 wherein comparing words on nodes comprises:
    matching two similar words; and
    assigning a score to the match.

39. The method of claim 27 wherein matching further comprises:
    assigning a score to the comparison of the words on nodes and to the comparison of relation types; and
    obtaining an overall score for the match of the input logical form and the selected logical graph in the candidate set by combining the scores assigned to the comparisons of words and relation types.

40. The method of claim 39 and further comprising:
    maintaining an ordered list of matches, arranged in order of the overall scores for the matches.

41. The method of claim 40 wherein providing an output comprises:

providing the output as a copy of the logical graphs in the LKB having an overall score above a threshold score.

42. The method of claim 24 wherein the LKB includes translation information indicative of a translation from a first language to a second language and wherein providing an output comprises:

providing the translation information associated with at least one of the matching logical graphs.

43. The method of claim 24 wherein the LKB is based on a first language, and wherein providing an output comprises:

providing a link to a logical graph in a second LKB which is based on a second language different from the first language.

44. The method of claim 43 wherein providing an output comprises:

providing a textual output corresponding to a textual segment used in generating the logical graph pointed to in the second LKB.

45. The method of claim 43 wherein providing an output comprises:

providing a pointer to a textual output corresponding to a textual segment used in generating the logical graph pointed to in the second LKB.

46. The method of claim 24 wherein providing an output comprises:

providing a pointer to a textual segment which was used in generating at least one of the matching logical graphs.

47. The method of claim 24 wherein providing an output comprises:

providing a textual segment which was used in generating at least one of the matching logical graphs.

48. The method of claim 24 wherein providing an output comprises:

providing an input to an application program.

49. The method of claim 48 wherein the application program includes one or more frames to be filled and wherein providing an input to an application program comprises:

providing a textual input to fill a frame in the application program.

50. The method of claim 48 wherein the selected matching logical graph contains links to modules causing the frames to be filled, and wherein providing an output comprises:

providing the links, along with the words in the input logical form, to fill the application program frames with the words.

51. The method of claim 24 and further comprising:

receiving an nth textual segment;

obtaining an nth input logical form based on the nth textual segment; and preferentially matching the nth input logical form against logical graphs in a portion of the LKB proximate to the one or more matching logical graphs.

52. The method of claim 51 wherein preferentially matching comprises:

weighting each of the plurality of different combinations with a weighting value; and selecting the one or more matching logical graphs based on the weighting values.

53. The method of claim 52 wherein preferentially matching comprises:

increasing the weighting values associated with the one or more matching logical graphs.

54. An apparatus for determining a relationship between a first textual segment and a second textual segment, the apparatus comprising:

a lexical knowledge base (LKB) including interconnected logical graphs representative of a plurality of textual segments, including the second textual segment;

an input analyzer configured to receive the first textual segment and generate an input logical form based on the first textual segment; and a matching component, coupled to the input analyzer and the LKB, and configured to match the input logical form against the logical graphs in the LKB, identifying logical graphs as matching logical graphs based on graph matching criteria, even if the matching logical graphs differ from the input logical form lexically or structurally, and provide an output based on the matching logical graphs.

55. The apparatus of claim 54 wherein the input analyzer is configured to generate the input logical form by obtaining at least one logical relation indicative of the first textual segment, each logical relation including at least first and second words connected by a relation.

56. The apparatus of claim 55 wherein the matching component is configured to identify a set of paths in the LKB which connect the first and second words in the logical relation, determine whether each word in the identified paths, other than the first and second words, is similar to the first or second words, and, if so, identify the word in the path as a similar word (simword), and identify additional matching logical graphs based on the simwords identified.

57. The apparatus of claim 56 wherein the matching component is further configured to repeat the steps of identifying a set of paths, determining whether each word in the identified paths are similar to the first or second word, and identifying additional matching logical graphs, for each logical relation in the input logical form.

58. The apparatus of claim 56 wherein the matching component is further configured to select one or more of a plurality of different combinations of the matching logical graphs and additional logical graphs as selected matching logical graphs, and provide the output based on the selected matching logical graphs.

59. The apparatus of claim 58 wherein the matching component is configured to select one of the plurality of different combinations by:

weighting each of the plurality of different combinations with a weighting value; and selecting the selected matching logical graph based on the weighting values.

60. The apparatus of claim 59 wherein the LKB is based on a first language, and wherein the matching component provides the output as a link to a logical graph in a second LKB which is based on a second language different from the first language.

61. The apparatus of claim 59 wherein the LKB includes translation information indicative of a translation form a first language to a second language, and wherein the matching component provides the output based on translation information associated with the selected matching logical graph.

62. The apparatus of claim 58 wherein the matching component is configured to provide the output as a textual output corresponding to a text segment used in generating the logical graph pointed to in the second LKB.

63. The apparatus of claim 58 wherein the matching component is configured to provide the output as a pointer to a textual item containing a text segment used in generating the logical graph pointed to in the second LKB.

64. The apparatus of claim 58 wherein the matching component is configured to provide the output as a pointer to a textual segment which was used in generating the selected matching logical graph.

65. The apparatus of claim 58 wherein the matching component is configured to provide the output as a textual segment which was used in generating the selected matching logical graph.

66. The apparatus of claim 58 wherein the matching component is configured to provide the output as an input to an application program.

67. The apparatus of claim 66 wherein the application program includes one or more frames to be filled and wherein the matching component is configured to provide the input to the application program as a textual input to fill a frame in the application program.

68. The apparatus of claim 58 wherein the input analyzer is configured to receive a second textual segment and generate a second input logical form based on the second textual segment, and wherein the matching component is configured to preferentially match the second input logical form against logical graphs in a portion of the LKB proximate the selected matching logical graph.

69. The apparatus of claim 68 wherein the matching component is configured to select one of the plurality of different combinations by:
    weighting each of the plurality of different combinations with a weighting value; and
    selecting the selected matching logical graph based on the weighting values.

70. The apparatus of claim 69 wherein the matching component is configured to preferentially match by:
    increasing the weighting values associated with the selected matching logical graph.

71. The apparatus of claim 54 wherein the matching component is configured to match by:
    prior to matching, identifying a starting point in the input logical form; and
    if the starting point is not a root of the input logical form, reconfiguring the input logical form such that the starting point comprises a root of the input logical form.

72. The apparatus of claim 71 wherein the matching component is configured to match by:
    identifying words in the LKB which are similar to the root (simwords); and
    matching the input logical form against the root and simwords in the LKB.

73. The apparatus of claim 72 wherein the matching component is configured to match by:
    matching the words and relations in the input logical form against logical graphs in the LKB, to obtain one or more matching logical graphs.

74. The apparatus of claim 71 wherein the matching component is configured to match by:
    identifying a candidate set of logical graphs in the LKB having, as a root, the root word of the input logical form, or a simword.

75. The apparatus of claim 74 wherein the matching component is configured to match by:
    ordering the candidate set of logical graphs based on whether each candidate in the set of logical graphs contains words in the input logical form or simwords and the number of simwords contained; and
    matching against the candidate set in order.

76. The apparatus of claim 74 wherein the matching component is configured to match by:
    selecting a logical graph in the candidate set;
    comparing words on nodes and relation types in the input logical form to words on nodes and relation types in the selected one of the logical graphs in the candidate set; and
    repeating the steps of selecting and comparing a plurality of times.

77. The apparatus of claim 76 wherein the matching component is configured to match by:
    identifying relation types in the selected logical graph in the candidate set which are identical to relation types in the input logical form; and
    assigning a highest score to the identical match of relation types.

78. The apparatus of claim 76 wherein the matching component is configured to match by:
    identifying relation types in the selected logical graph in the candidate set which are paraphrases of relation types in the input logical form; and
    assigning a score to the match of relation types that is lower than a score for an identical match.

79. The apparatus of claim 76 wherein the matching component is configured to match by:
    matching patterns of subgraphs in the selected logical graph in the candidate set with patterns of subgraphs in the input logical form.

80. The apparatus of claim 76 wherein the matching component is configured to match by:
    matching two similar words on nodes; and
    assigning a score to the match.

81. The apparatus of claim 76 wherein the matching component is configured to match by:
    assigning a score to the comparison of the words on nodes and to the comparison of relation types; and
    obtaining an overall score for the match of the input logical form and the selected logical graph in the candidate set by combining the scores assigned to the comparisons of words and relation types.

82. The apparatus of claim 81 wherein the matching component is configured to match by:
    maintaining an ordered list of matches, arranged in order of the overall scores for the matches.

83. The apparatus of claim 82 wherein the matching component is configured to provide an output by:
    providing the output as a copy of the logical graphs in the LKB having an overall score above a threshold score.

84. The apparatus of claim 73 wherein the LKB includes translation information indicative of a translation from a first language to a second language and wherein the matching component is configured to provide an output by:
    providing the translation information associated with at least one of the matching logical graphs.

85. The apparatus of claim 73 wherein the LKB is based on a first language, and wherein the matching component is configured to provide an output by:
    providing a link to a logical graph in a second LKB which is based on a second language different from the first language.

86. The apparatus of claim 73 wherein the matching component is configured to provide an output by:
    providing a textual output corresponding to a textual segment used in generating the logical graph pointed to in the second LKB.

87. The apparatus of claim 85 wherein the matching component is configured to provide an output by:

providing a pointer to a textual output corresponding to a textual segment used in generating the logical graph pointed to in the second LKB.

88. The apparatus of claim 73 wherein the matching component is configured to provide an output by:

providing a pointer to a textual segment which was used in generating at least one of the matching logical graphs.

89. The apparatus of claim 73 wherein the matching component is configured to provide an output by:

providing a textual segment which was used in generating at least one of the matching logical graphs.

90. The apparatus of claim 73 wherein the matching component is configured to provide an output by:

providing an input to an application program.

91. The apparatus of claim 90 wherein the application program includes one or more frames to be filled and wherein the matching component is configured to provide an input to an application program by:

providing a textual input to fill a frame in the application program.

92. The apparatus of claim 90 wherein the selected matching logical graph contains links to modules causing the frames to be filled, and wherein the matching component is configured to provide an output by:

providing the links, along with the words in the input logical form, to fill the application program frames with the words.

93. The apparatus of claim 73 wherein the matching component is configured to match by:

receiving an nth textual segment;

obtaining an nth input logical form based on the nth textual segment; and preferentially matching the nth input logical form against logical graphs in a portion of the LKB proximate to the one or more matching logical graphs.

94. The apparatus of claim 93 wherein the matching component is configured to preferentially match by:

weighting each of the plurality of different combinations with a weighting value; and selecting the one or more matching logical graphs based on the weighting values.

95. The apparatus of claim 93 wherein the match component is configured to preferentially match by:

increasing the weighting values associated with the one or more matching logical graphs.

96. A method of determining a relationship between first and second relations, each relation including at least first and second words connected by a semantic relation, the method comprising:

receiving the first relation;

matching the first relation against at least one of a plurality of second relations, identifying second relations as matching even if the matching relations differ from the first relations lexically or structurally; and providing an output based on the matching relations.

97. The method of claim 96 wherein matching comprises:

obtaining a lexical knowledge base (LKB) having obtaining an input logical form based on the first textual segment; and matching the input logical form against logical graphs in the LKB.

98. A computer readable medium containing instructions stored thereon which, when executed, configure a computer to determine a relationship between a first textual segment and textual information in a data base having a plurality of interconnected logical graphs, each representative of a textual segment in a corpus, by receiving the first textual segment, generating an input logical form based on the first textual segment and further comprising:

matching the input logical form against the logical graphs in the data base, identifying logical graphs as matching even if they differ from the input logical form lexically or structurally.

* * * * *